US012625316B2

(12) United States Patent
Alvear et al.

(10) Patent No.: US 12,625,316 B2
(45) Date of Patent: May 12, 2026

(54) DISPLAY OF LIGHT PATTERNS ON A FLEXIBLE GUIDE SHEET

(71) Applicant: VALEO VISION, Bobigny (FR)

(72) Inventors: Eduardo Alvear, Bobigny (FR); Sidahmed Beddar, Bobigny (FR); Benoit Delande, Bobigny (FR); Hafid El-Idrissi, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/866,816

(22) PCT Filed: May 31, 2023

(86) PCT No.: PCT/EP2023/064616
§ 371 (c)(1),
(2) Date: Nov. 18, 2024

(87) PCT Pub. No.: WO2023/232907
PCT Pub. Date: Dec. 7, 2023

(65) Prior Publication Data
US 2025/0347838 A1     Nov. 13, 2025

(30) Foreign Application Priority Data

May 31, 2022     (FR) ...................................... 2205231

(51) Int. Cl.
*F21V 8/00*                    (2006.01)
(52) U.S. Cl.
CPC ......... *G02B 6/0028* (2013.01); *G02B 6/0068* (2013.01); *G02B 6/0076* (2013.01)
(58) Field of Classification Search
CPC .. G02B 6/0036; G02B 6/0038; G02B 6/0068; G02B 6/006; G02B 1/045; G02B 6/0088; G02B 6/0065; G02B 6/005; F21V 8/00
See application file for complete search history.

(56) References Cited

U.S. PATENT DOCUMENTS 6,002,079 A  *  12/1999  Shin ..................... G02B 6/0036
                                                                84/600
2011/0277361 A1    11/2011  Nichol et al.

FOREIGN PATENT DOCUMENTS

WO          2010080289 A2     7/2010
WO          2011130715 A2     11/2011
(Continued)

OTHER PUBLICATIONS

European Patent Office, International Search Report (with English translation) and Written Opinion of corresponding PCT Application No. PCT/EP2023/064616, dated Aug. 11, 2023.

*Primary Examiner* — William J Carter
(74) *Attorney, Agent, or Firm* — Valeo Vision

(57)                    ABSTRACT

The invention relates to a lighting module including an assembly of at least one flexible guide sheet, each flexible guide sheet of the assembly being suitable for receiving light rays at an edge of the flexible guide sheet and for reflecting the light rays in a direction substantially normal to a surface of the flexible guide sheet according to at least one pattern etched in the flexible guide sheet. The assembly is suitable for returning light according to a first pattern and a second pattern. The module includes a first and a second light injection element suitable for distributing light in the assembly of at least one flexible guide sheet. At least one light source is suitable for selectively injecting light into the first and second light injection elements so as to form the first pattern or the second pattern.

20 Claims, 7 Drawing Sheets

(56) References Cited

FOREIGN PATENT DOCUMENTS

| WO | 2012068543 | A1 | 5/2012 |
|----|------------|----|--------|
| WO | 2013134017 | A1 | 9/2013 |
| WO | 2016001597 | A1 | 1/2016 |

* cited by examiner

DISPLAY OF LIGHT PATTERNS ON A FLEXIBLE GUIDE SHEET

TECHNICAL FIELD

The present invention relates to the field of luminous modules, notably light guidance luminous modules. The invention particularly, but not exclusively, applies to the display of dynamic information or animations based on light patterns.

BACKGROUND OF THE INVENTION

It is now a requirement for such animations to be created in numerous items of equipment in order to convey information, for aesthetic customization purposes or to create ambiance.

It is also a requirement for animations to be created with a high resolution level.

To this end, it is known practice to use screens, such as LCD screens.

However, this technology is not only expensive but also sensitive to environmental conditions such as temperature, humidity or UV radiation.

Furthermore, it is preferable to have a flexible luminous module in order to facilitate its integration into any type of equipment.

Therefore, a requirement exists for a luminous module that is able to create an animation, and that is reliable, inexpensive and easy to integrate in any type of equipment.

SUMMARY OF THE INVENTION

The present invention improves the situation.

For this purpose, a first aspect relates to a luminous module comprising: an assembly of at least one flexible guide sheet, with each flexible guide sheet of the assembly being able to receive luminous rays via at least one edge of the flexible guide sheet and to reflect the luminous rays in a direction substantially normal to a surface of the flexible guide sheet according to at least one pattern etched in the flexible guide sheet, with the assembly being able to reflect light according to a first pattern and a second pattern etched in said assembly; at least one first and one second light injection element, with each of the first and second injection elements being able to receive light and to distribute the light throughout the assembly of at least one flexible guide sheet; at least one light source able to selectively inject light into the first light injection element and into the second light injection element; wherein the first light injection element and the assembly of at least one flexible guide sheet are arranged so as to project light according to the first pattern and wherein the second light injection element and the assembly of at least one flexible guide sheet are arranged so as to project light according to the second pattern.

Thus, the use of an assembly of flexible guide sheets allows a flexible luminous module to be obtained that is therefore adaptable to numerous functionalities, with its integration into any type of equipment being facilitated. The selective injection of light into at least two light injection elements allows the display of the first and second patterns to be controlled, and thus allows animations to be created that are based on such patterns. Furthermore, the number of sources is minimized by using light guides, which reduces the costs as well as the footprint of the luminous module.

According to one embodiment, each injection element from among the first injection element and the second injection element can comprise a plurality of injection guides, with each injection guide being able to receive light from one end of the guide and to guide the light to a given longitudinal position on the injection element, with the longitudinal positions of the injection guides all being different in such a way as to longitudinally distribute the light through the injection element.

This allows light to be homogeneously distributed in the edge of the flexible guide sheet, which improves the projection quality of the first and second patterns.

According to one embodiment, the module may comprise a first light source able to inject light into the first light injection element and a second light source able to inject light into the second light injection element.

Providing one light source per injection element facilitates the control of the selective injection of light into the first and second injection elements.

In addition, the first light source may be able to generate light in a first wavelength range and the second light source may be able to generate light in a second wavelength range, different to the first range.

Thus, the patterns may assume different colors, which facilitates the customization of an animation created from the first and second patterns.

In addition, the first and second patterns may be geometrically identical.

Thus, it is then possible to dynamically vary the color of a single pattern in order to create an animation or to convey information depending on the color of the pattern.

As a variant, the light source may be able to selectively inject light into a first optical fiber connected to the first injection guide and into a second optical fiber connected to the second injection guide.

Such an embodiment reduces the footprint close to the flexible guide sheets and allows the light source to be moved away from the flexible guide sheets. Therefore, the integration of the luminous module in equipment with footprint constraints is facilitated.

In addition, the light source may be a laser source.

The module is thus able to project patterns with high luminous energy density.

According to a first embodiment, the first injection element may be arranged in such a way as to inject light into a first section of the edge of the flexible guide sheet of the assembly, and the second injection element may be arranged in such a way as to inject light into a second section of the edge of the flexible guide sheet, with a first portion of the flexible guide sheet located opposite the first section of the edge being etched according to the first pattern, and a second portion of the flexible guide sheet located opposite the second section of the edge being etched according to the second pattern.

Thus, several patterns may be individually displayed on the same flexible guide sheet.

According to other embodiments, the assembly may comprise at least one first and one second flexible guide sheet, with the first pattern being etched in the first flexible guide sheet and the second pattern being etched in the second flexible guide sheet, with the first injection element being arranged in such a way as to inject light into an edge of the first flexible guide sheet and the second injection element being arranged in such a way as to inject light into an edge of the second flexible guide sheet.

In these embodiments, a pattern is etched in each flexible guide sheet, which allows the patterns to be multiplied, without reducing their size, in the form of an equal flexible guide sheet.

According to a second embodiment, the first and second guide sheets may be superimposed in the luminous module, in order to project the first and second patterns in a common area of the luminous module.

It is thus possible to create an animation by varying a pattern in the common area.

As a variant, according to a third embodiment, the first and second guide sheets may be placed next to one another in such a way as to project the first and second patterns at distinct positions.

It is thus possible to create animations with spatial displacement of a pattern, or to project several patterns at a time, which increases the number of combinations of patterns that may be provided for a given number of flexible guide sheets.

In addition, the assembly may comprise more than two flexible guide sheets placed next to one another in such a way as to form a matrix of flexible guide sheets, with each flexible guide sheet being associated with a light injection element able to inject light into an edge of the flexible guide sheet and each flexible guide sheet having at least one pattern etched in said flexible guide sheet.

Thus, each flexible guide sheet is a matrix element of the luminous module, which allows complex animations to be created from light patterns.

In addition or as a variant, the flexible guide sheets of the assembly can have the same square or rectangular shape.

The manufacture of the luminous module is thus simplified and the associated costs are reduced.

In addition, a dimension of the shape of the guide sheets ranges between 3 and 25 cm, notably between 3 and 5 centimeters.

Thus, the matrix elements that are the flexible guide sheets are small, which allows a luminous module to be produced with a large number of flexible guide sheets. This allows numerous patterns to be projected and therefore allows complex luminous animations to be created.

According to one embodiment, the module may further comprise a control element able to control said at least one source in order to selectively project light according to the first pattern and according to the second pattern.

Thus, a single element is able to selectively control the injection of light into the various light injection elements of the luminous module, which improves the synchronization of the display of the light patterns relative to one another.

In addition, the control element may be adapted to dynamically control said at least one source in such a way as to produce a light animation comprising at least the first and second patterns.

This makes it easier to create light animations from the patterns.

According to one embodiment, the thickness of each flexible guide sheet of the assembly may range between 0.2 and 1 mm.

Such a thickness allows the flexible guide sheet to be highly flexible, and facilitates its integration, notably on curved supports.

According to one embodiment, at least one flexible guide sheet of the assembly may be made of a transparent material.

This increases the integration possibilities of the luminous module, as well as its aesthetic appearance.

At least one flexible guide sheet may be semi-transparent or opaque.

In addition, each flexible guide sheet in the assembly may comprise a polycarbonate (PC), polymethyl methacrylate (PMMA), thermoplastic polyurethane (TUP) or polyethylene terephthalate (PET) film.

Such materials allow a transparent and flexible guide sheet to be produced.

According to one embodiment, each flexible guide sheet may comprise a flexible film comprising microstructures, in which each pattern from among the first and second patterns is etched by ultraviolet printing of the microstructures of the flexible film.

Such microstructures allow patterns to be produced with good resolution, while maintaining a high level of transparency of the flexible guide sheet.

In addition, for each flexible guide sheet, a surface density of microstructures may decrease with the distance from the edge of the guide sheet into which the light is injected.

The homogeneity of a pattern projected by the flexible guide sheet is thus improved.

A second aspect of the invention relates to a method for controlling a luminous module according to the first aspect of the invention, implemented by a control element able to control said at least one source in order to selectively project light according to the first pattern and according to the second pattern, the method comprising receiving an animation command, with the animation command identifying an animation comprising a series of patterns comprising the first pattern and the second pattern, and controlling said at least one source as a function of the animation command, in such a way as to dynamically project said animation.

A third aspect of the invention relates to a method for manufacturing a luminous module comprising the following steps of:

providing a roll of flexible film able to guide light in the thickness thereof;

etching at least one first and one second pattern on said roll of flexible film using ultra-violet printing;

cutting said roll in order to obtain an assembly of at least one flexible guide sheet with a given dimension, with the assembly comprising the first pattern and the second pattern;

arranging a first injection element and a second injection element relative to the assembly of at least one flexible guide sheet in order to form a luminous module;

arranging at least one light source in the luminous module in such a way as to selectively inject light into the first light injection element and into the second light injection element.

The first light injection element and the assembly of at least one flexible guide sheet are arranged in such a way as to project light according to the first pattern and the second light injection element and the assembly of at least one flexible guide sheet are arranged in such a way as to project light according to the second pattern.

The flexible film is thus mechanically protected, which increases its service life. The protective layers may also protect the flexible film from UV rays, which prevents deterioration of the etching of the pattern in the flexible guide sheet.

According to one embodiment, after etching the first and second patterns, the manufacturing method may further comprise laminating the roll of flexible film in order to add transparent protective layers on either side of the flexible film.

BRIEF DESCRIPTION OF DRAWINGS

Further features and advantages of the invention will become apparent with reference to the following detailed description and the appended drawings, in which.

DETAILED DESCRIPTION OF THE INVENTION

The description concentrates on the features that differentiate the methods or the luminous module from those known in the prior art.

Figure 1:
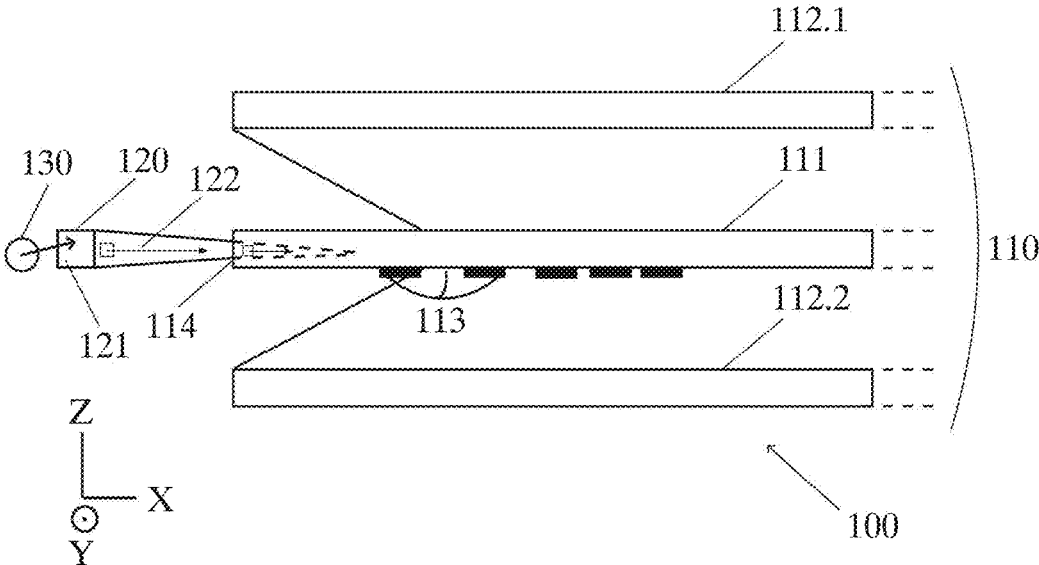
FIG. 1 illustrates a portion of a luminous module according to the invention.

FIG. 1 shows a portion of a luminous module 100 according to the invention.

The luminous module 100 comprises a flexible guide sheet 110 able to receive luminous rays via an edge 114 and to reflect the luminous rays in a direction Z substantially normal to a surface of the flexible guide sheet that thus extends in an X-Y plane in FIG. 1.

Guide sheet is understood to mean an optical guide element, one of the dimensions of which is much smaller than the other two dimensions in space, for example, smaller by one or more orders of magnitude. As illustrated in FIG. 1, in this case it is a flexible guide sheet with a thickness along the Z axis that is at least two orders of magnitude smaller than its dimensions in the X-Y plane in which the flexible guide sheet 110 extends.

The flexible guide sheet 110 may comprise a flexible film 111 at its core comprising at least one edge 114 able to guide the luminous rays in an overall direction X, and comprising an assembly of microstructures 113 able to reflect the luminous rays guided in the flexible film 111 outside the flexible guide sheet 110, notably in one or more directions substantially along the Z axis.

The flexible film 111 may be a substrate film made of polycarbonate (PC), polymethyl methacrylate (PMMA), thermoplastic polyurethane (TUP) or polyethylene terephthalate (PET). The flexible film 111 may have a thickness, that is a dimension along the Z axis, ranging between 12 and 1,000 micrometers. More specifically, the thickness of the flexible film 111 may range between 50 and 1,000 micrometers, for example, between 200 and 500 micrometers. As a variant, the flexible guide sheet 110 has a thickness ranging between 200 and 1,000 micrometers.

The aforementioned materials, combined with a low thickness as described above, allow a flexible film 111 to be obtained. Other materials may be considered for the composition of the flexible film 111. However, it is preferable, according to the invention, to provide deformable, transparent materials.

A thin coating of microstructures 113 may be applied to one of the faces of the flexible film 111, or be integrated in the flexible film 111. The microstructure coating 113 notably may have a thickness of less than 20 micrometers along the Z axis.

Such microstructures 113 may generally assume the form of a bump, on which the luminous rays are reflected in a direction substantially along the Z axis. Such microstructures 113 may be adapted such that the luminous rays exiting the flexible film 111 form a pattern. For this purpose, the microstructures 113 may be etched by ultraviolet printing, according to the desired pattern.

Microstructures 113 are understood to be structures, or irregularities of the flexible film, with dimensions of less than a few micrometers. Microstructures thus also include nanometric structures. Such sizes of microstructures 113 ensure high transparency of the flexible film 111. In particular, a transparency of the order of 97% may be obtained in practice by the use of microstructures 113. As a variant, the flexible guide sheet may be semi-transparent or opaque.

Advantageously, the microstructures 113 may be distributed along the X axis in such a way that a linear density of microstructures 113 is proportional to the distance from the edge 114 via which the luminous rays injected by the injection element 120 are received. In other words, the further away the microstructures 113 are from the edge 114, the more densely they are grouped together. Such a distribution advantageously ensures homogeneous distribution of the luminous intensity of the pattern emitted by the flexible guide sheet 110 along the X axis.

The flexible guide sheet 110 may further comprise one or two optional protective layers 112.1 and 112.2, which allow the flexible film 111 to be mechanically protected. Furthermore, at least one of the protective layers 112.1 and 112.2 may comprise an anti-UV treatment, allowing the flexible film to be protected against UV rays, once the microstructures 113 have been etched. Without such UV protection, the pattern projected by the flexible guide sheet 110 is likely to deteriorate over time, notably when it is exposed to sunlight.

The flexible film 111 and the protective layers 112.1 and 112.2 are shown spaced apart in FIG. 1, purely for illustrative purposes. It will be understood, however, that the protective layers 112.1 and 112.2 may be attached to the flexible film, notably by lamination.

Since the guide sheet 110 is flexible, it is not necessarily included in a plane but may be curved, depending on the position in which it is placed and the mechanical constraints applied thereto.

The portion of the luminous module 100 illustrated in Fig. I also comprises a light injection element 120, also referred to as a light bar, because it extends longitudinally in a direction Y, and is able to inject light in a direction normal to its longitudinal direction, for example, along the X axis when it is arranged in the manner shown in FIG. 1.

The light injection element 120 has a rectangular or square section in FIG. 1. However, the light injection element 120 may have a round, oval, or polygonal section.

Thus, the light injection element 120 comprises an output surface 122 extending in the longitudinal direction and able to inject light in a direction substantially normal to the output surface 122. The light injection element 120 further comprises an input surface 121, at one end of the light injection element 120, able to receive luminous rays from a light source 130, and the light injection element 120 is able to longitudinally guide the light along the Y axis, distributing it over the output surface 122. The distribution of light by the output surface 122 will be more clearly understood from the description of FIG. 2.

No restriction is imposed on the light source 130. It may be, for example, a light-emitting source of the LED type, for example, having the advantage of being small, having low energy consumption and having low heat build-up. The light source 130 may be able to generate light in a wavelength range. Such a range may be centered around a visible color, in order to generate colored light, for example, blue, red, or green. As a variant, the light source 130 may emit luminous rays across the entire range of wavelengths visible to the human eye, in such a way as to generate white light. A very narrow wavelength range may be produced by a laser type light source 130.

As a variant, the light source 130 is not arranged directly opposite the input surface 121 of the injection element 120, but the luminous module 100 further comprises an optical fiber placed between the source 130 and the injection element 120, which allows the source 130 to be moved away from the assembly formed by the injection element 120 and the flexible guide sheet 110.

Figure 2:
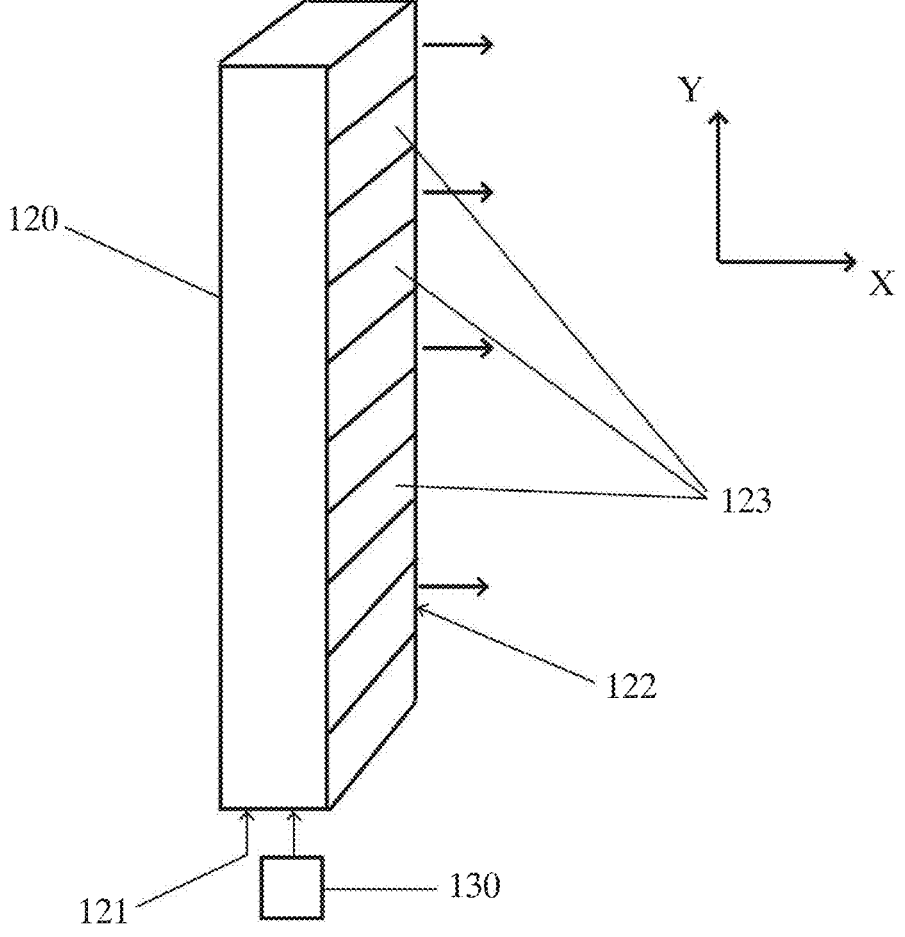
FIG. 2 illustrates an injection element of a luminous module according to one embodiment of the invention.

FIG. 2 shows an injection element 120 of a luminous module 100 according to one embodiment of the invention.

The injection element 120 may comprise a plurality of injection guides 123 able to receive light from the source 130 via the input surface 121 and to guide the light to a longitudinal position on the output surface 122, with the longitudinal positions of the light guides being distinct in such a way as to distribute the light to at least several longitudinal positions on the output surface 122.

This allows light to be injected at different longitudinal positions along the Y axis on the edge 114. Each longitudinal position on the edge 114 may correspond to a guide line of the flexible film 111, able to guide the light along the X axis along such a guide line.

Such a combination of a flexible guide sheet 110, an injection element 120 and a source 130 thus allows light to be projected in the direction Z via a flexible, transparent, semi-transparent or opaque surface, with good surface homogeneity and according to a given pattern.

In practice, such a luminous module may allow a pattern to be emitted with a brightness ranging between 100 and 1,000 candelas per square meter, with a light extraction efficiency that may range between 25% and 80%.

Details concerning the structure and the arrangement of these elements 110, 120 and 130 are described in further detail in the international patent application published under number WO 2011/130715 A2.

A luminous module according to the invention comprises:

an assembly of at least one guide sheet, such as the flexible guide sheet 110 illustrated in FIG. 1, with the assembly being able to reflect light according to a first pattern and a second pattern;

at least one first light injection element and one second light injection element, with each light injection element being able to be the injection element 120 described with reference to FIGS. 1 and 2; and at least one light source, such as the light source 130 described above with reference to FIG. 1, able to selectively inject light into the first and second injection elements.

According to the invention, the first light injection element and the assembly of at least one flexible guide sheet are arranged in such a way as to project light according to the first pattern and the second light injection element and the assembly of at least one flexible guide sheet are arranged in such a way as to project light according to the second pattern.

Thus, the selective injection of light into the first injection element and into the second injection element allows an animation to be created from the first and second patterns. Such an animation thus may be produced by a flexible luminous module at a low cost, is easy to manufacture, has a high resolution and a high luminous intensity.

"Pattern" is understood to mean any predefined spatial distribution of the luminous intensity emitted by the luminous module. In particular, reference is made herein to a two-dimensional or one-dimensional pattern. A pattern thus may be a two-dimensional shape or symbol obtained by contrasting between the luminous intensities of various positions in the X-Y plane of the flexible guide sheet 110. The pattern may also comprise a plurality of shapes or symbols. Alternatively, a pattern covers a predefined, or intentional, spatial distribution of luminous intensity that does not cause any general shape to appear, such as a distribution resulting in a cloud of luminous dots. In the context of the present invention, a pattern is formed by injecting light into an injection element that is arranged relative to a flexible guide sheet in such a way as to form the pattern on the flexible guide sheet.

Particular embodiments of the invention are described hereafter.

Figure 3:
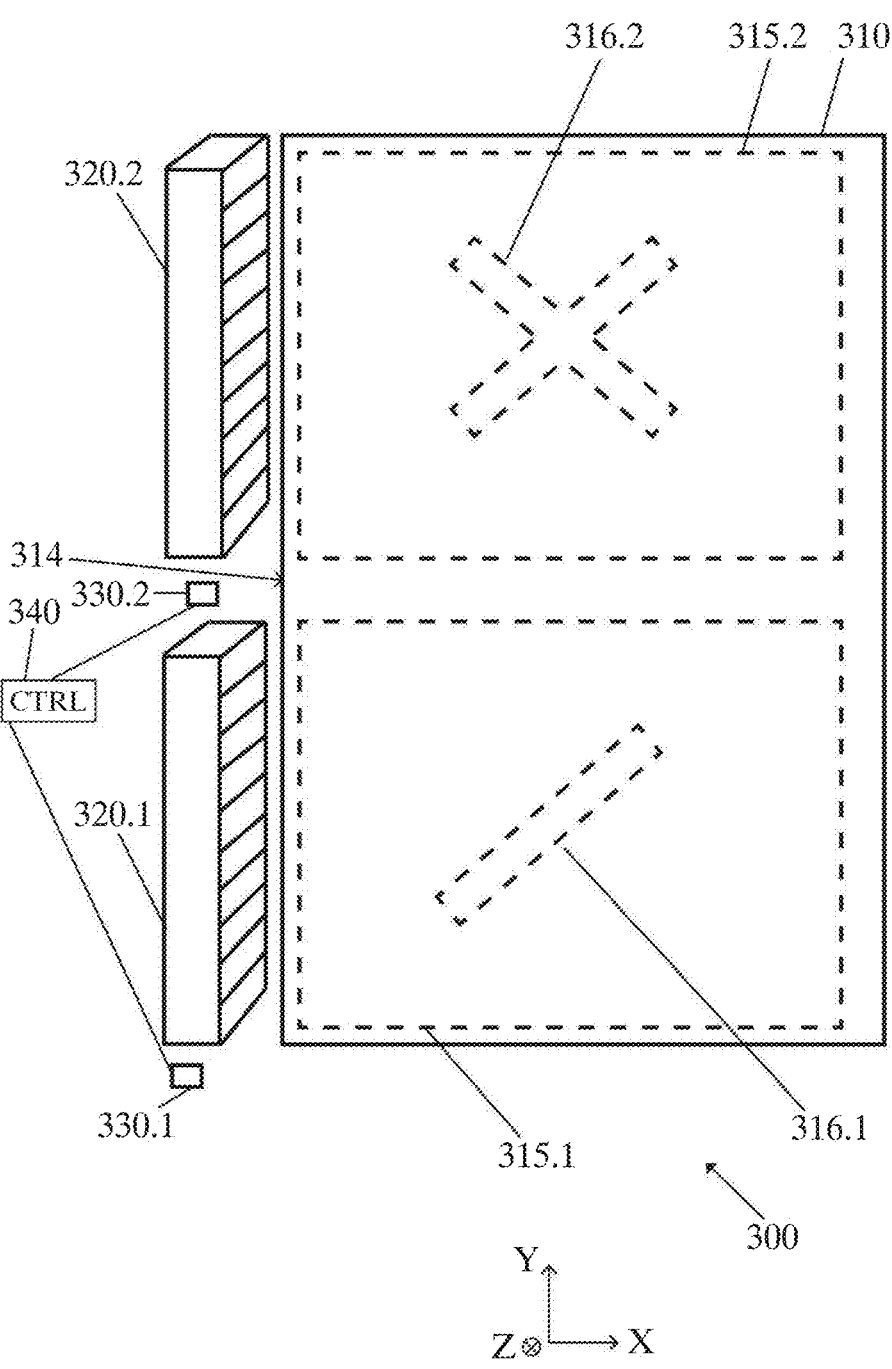
FIG. 3 illustrates a luminous module according to a first embodiment of the invention.

FIG. 3 illustrates a luminous module 300 according to a first embodiment of the invention.

In the first embodiment, several injection elements are arranged in order to inject light into the same flexible guide sheet, comprising several patterns.

In particular, in the example of FIG. 3, a first injection element 320.1 and a second injection element 320.2 are arranged in such a way as to inject light into an edge 314 of a flexible guide sheet 310.

The first and second injection elements 320. 1 and 320.2 may be similar to the injection element 120 described with reference to FIGS. 1 and 2. Similarly, the flexible guide sheet 310 may correspond to the flexible guide sheet 110 described above.

As shown in FIG. 3, the first injection element 320.1 and the second injection element 320.2 are arranged in such a way as to inject light into the edge 314, at distinct longitudinal positions, along the Y axis.

It should be noted that, because it is flexible, the guide sheet 310 may not be flat but may be curved. FIG. 3 thus shows the luminous module 300 when the guide sheet is flat, for example, placed on a flat rigid support.

The first injection element 320.1 is thus able to inject light into the edge 314, which light is then guided by the flexible guide sheet 310 into a first portion 315.1 of the flexible guide sheet 310. The second injection element 320.2 is able to inject light into the edge 314, which light is then guided into a second portion 315.2 of the flexible guide sheet 310.

For this purpose, a first source 330.1 is arranged opposite an input surface of the first injection element 320.1 in such a way as to propagate luminous rays inside the first injection element 320.1 and therefore toward the first portion 315.1 of the flexible guide sheet 310. A second source 330.2 is arranged opposite an input surface of the second injection element 320.2 in such a way as to propagate luminous rays inside the second injection element 320.2 and therefore toward the second portion 315.2 of the flexible guide sheet 310.

As a variant, a single source may be provided and the luminous module 300 comprises a first optical fiber able to convey light from the single source to the input surface of the first injection element 320.1 and a second optical fiber is able to convey light from the single source to the input surface of the second injection element 320.2.

The first and second sources 330.1 and 330.2, or the single source, may selectively inject into the first injection element 320. 1 and/or into the second injection element 320.2. Such selective injection may be controlled by a control element 340 connected to the two sources 330.1 and 330.2, or controlling the power supply to the two sources 330.1 and 330.2.

A first pattern 316.1 is etched in the first portion 315.1, while a second pattern 316.2 is etched in the second portion 315.2. The selective injection of light into the first injection element 320.1 and/or into the second injection element 320.2 thus allows projection of the first pattern, the second pattern, neither of the patterns or both patterns at the same time, thus allowing, by dynamic control, an animation to be created from at least the first and second patterns.

In the example of FIG. 3, the first and second patterns 316.1 and 316.2 have distinct shapes. However, according to the definition of pattern provided above, the patterns may be any intentional, or predetermined, spatial variation of luminous intensity. Furthermore, when the patterns are shapes, the first and second patterns 316.1 and 316.2 may have identical shapes. Animation is then enabled by the spatial movement of the pattern from the first portion 315.1 to the second portion 315.2, or vice versa. Furthermore, the colors respectively projected for each pattern may vary, when the sources 330.1 and 330.2 produce light of different colors.

An example with two patterns and two injection elements has been shown in FIG. 3. However, the first embodiment also covers a luminous module with a flexible guide sheet with three or more portions, with each portion comprising an etched pattern, and with at least three injection elements, with each injection element being placed opposite one of the portions.

Dedicated sources for each injection element may be provided for this purpose, or a single source with several optical fibers may be provided for this purpose.

Figure 4:
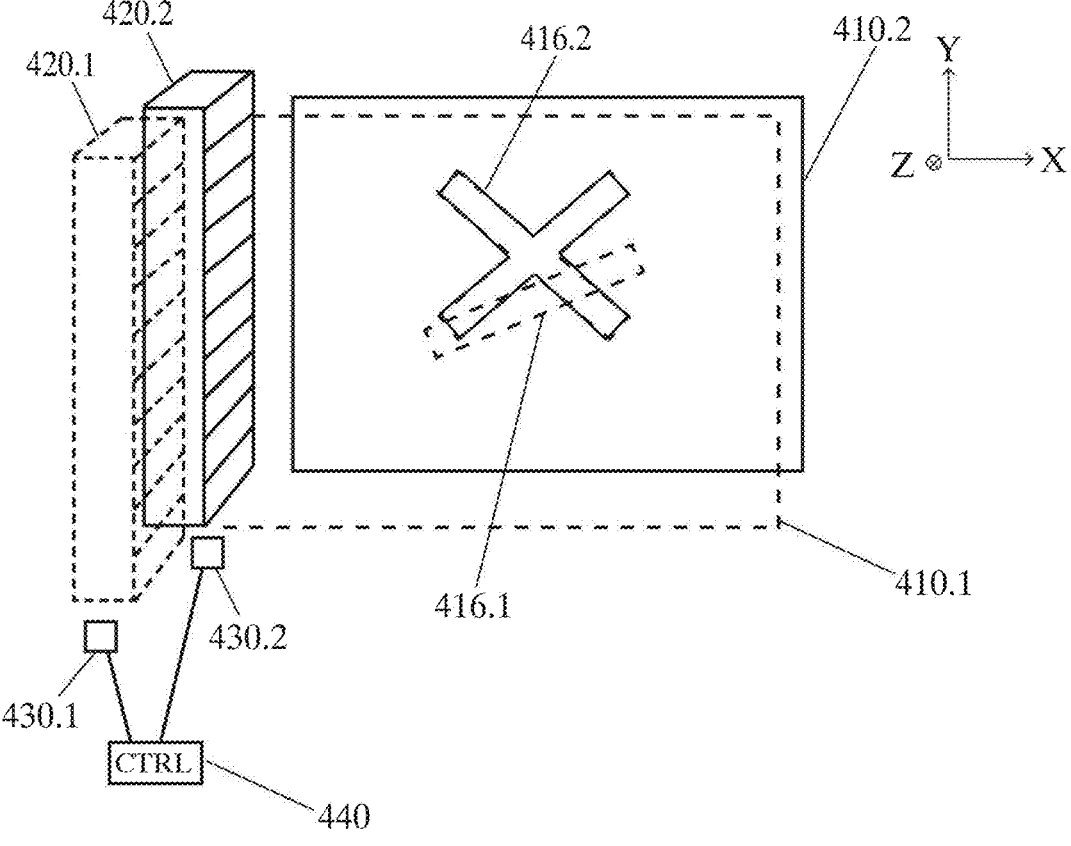
FIG. 4 illustrates a luminous module according to a second embodiment of the invention.

FIG. 4 illustrates a luminous module 400 according to a second embodiment of the invention.

In the second embodiment of the invention, the luminous module 400 comprises at least one first flexible guide sheet 410.1 and one second flexible guide sheet 410.2, with the two flexible guide sheets being superimposed, which means that at least a portion of the first flexible guide sheet 410.1, in the X-Y plane, is superimposed with at least a portion of the second flexible guide sheet 410.2, in a common area, which corresponds to a set of positions in the X-Y plane.

Preferably, the first and second flexible guide sheets 410.1 and 410.2 have the same dimensions in the X-Y plane, and are completely superimposed.

It should be noted that, because they are flexible, the guide sheets may not be flat but may be curved. FIG. 4 thus shows the luminous module 400 when the guide sheets are flat, for example, stacked on a flat support.

Such superposition is notably advantageous because the flexible guide sheets are preferably transparent, as described above.

Thus, the first and second flexible guide sheets 410.1 and 410.2 are able to respectively project a first pattern 416.1 and a second pattern 416.2 in a common area.

A first injection element 420.1 is arranged to inject light into an edge of the first flexible guide sheet 410.1 and a second injection element 420.2 is able and arranged to inject light into an edge of the second guide sheet 410.2.

For this purpose, a first source 430.1 is arranged opposite an input surface of the first injection element 420.1 in such a way as to propagate luminous rays inside the first injection element 420.1 and therefore toward the first flexible guide sheet 410.1. A second source 430.2 is arranged opposite an input surface of the second injection element 420.2 in such a way as to propagate luminous rays inside the second injection element 420.2 and therefore toward the second flexible guide sheet 410.2.

As a variant, a single source may be provided and the luminous module comprises a first optical fiber able to convey light from the single source to the input surface of the first injection element 420.1 and a second optical fiber is able to convey light from the single source to the input surface of the second injection element 420.2.

The first and second sources 430.1 and 430.2, or the single source, may selectively inject into the first injection element 420.1 and/or into the second injection element 420.2. Such selective injection may be controlled by a control element 440 connected to the two sources 430.1 and 430.2, or controlling the power supply to the two sources 430.1 and 430.2.

The first pattern 416.1 is etched in the first flexible guide sheet 410.1, while the second pattern 416.2 is etched in the second flexible guide sheet 410.2. The selective injection of light into the first injection element 420.1 and/or into the second injection element 420.2 thus allows projection of the first pattern, the second pattern, neither of the patterns or both patterns at the same time, thus allowing, by dynamic control, an animation to be created from at least the first and second patterns.

In the example of FIG. 4, the first and second patterns 416.1 and 416.2 have distinct shapes, and are identical to the patterns 316.1 and 316.2 of FIG. 3, for illustrative purposes. However, according to the definition of pattern provided above, the patterns may be any intentional, or predetermined, spatial distribution of luminous intensity. Furthermore, where the patterns are shapes, the first and second patterns 416.1 and 416.2 may have identical shapes but distinct colors. Indeed, the colors respectively projected for each pattern may vary, when the sources 430.1 and 430.2 produce light of different colors.

An example with two patterns, two injection elements and two flexible guide sheets has been shown in FIG. 4. However, the second embodiment also covers a luminous module with at least three flexible guide sheets with at least three injection elements, with each injection element being placed opposite one of the flexible guide sheets. Dedicated sources for each injection element may be provided for this purpose, or a single source with several optical fibers may be provided for this purpose.

At least one of the flexible guide sheets may be transparent. As a variant, according to the second embodiment, the flexible guide sheet located below the luminous module 400, i.e., the first flexible guide sheet 410.1, may be opaque or semi-transparent. Conversely, the second flexible guide sheet 410.2 is transparent or semi-transparent, so as to allow through at least some of the light emitted by the first flexible guide sheet 410.2.

Figure 5:
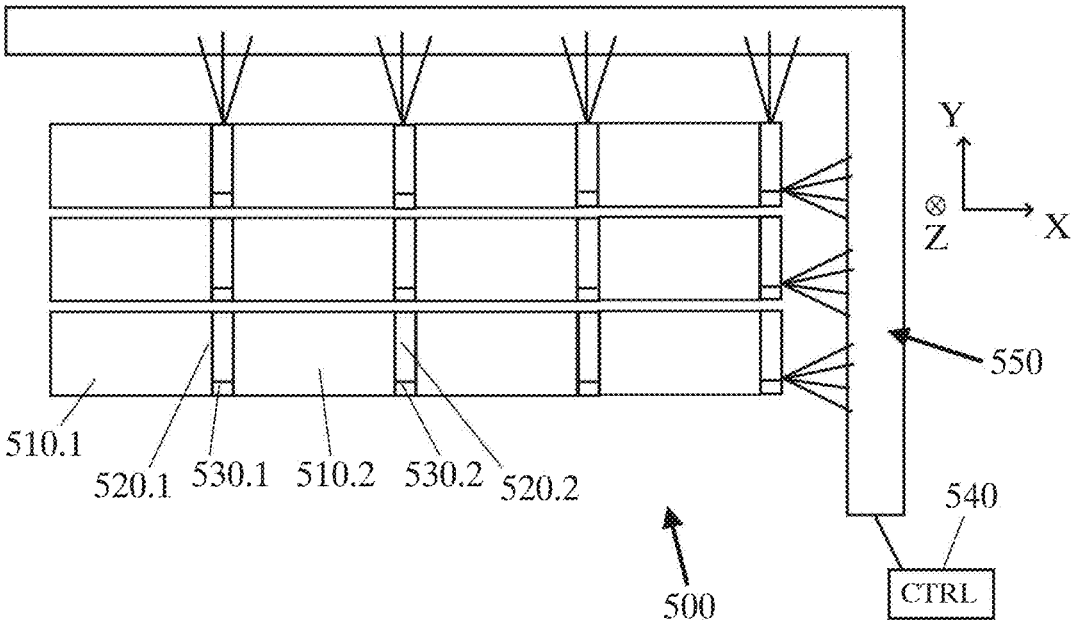
FIG. 5 illustrates a luminous module according to a third embodiment of the invention.

FIG. 5 illustrates a luminous module 500 according to a third embodiment of the invention.

In the third embodiment of the invention, the luminous module 500 comprises at least one first flexible guide sheet 510.1 and one second flexible guide sheet 510.2, with the two flexible guide sheets being placed next to one another, and the two flexible guide sheets are thus able to project luminous rays from distinct positions in the X-Y plane in which the flexible guide sheets mainly extend.

It should be noted that, because they are flexible, the guide sheets may not be flat but may be curved. FIG. 5 thus shows the luminous module 500 when the flexible guide sheets are flat, for example, placed on a flat rigid support.

Thus, the first flexible guide sheet 510.1 is able to project a first pattern, not shown, at a first position on the X-Y plane, and the second flexible guide sheet 510.2 is able to project a second pattern 516.2 at a second position on the X-Y plane, with the first and second positions being distinct, for example, next to one another. Each projected pattern may include a symbol or part of a symbol. When a pattern of a flexible guide sheet includes part of a symbol, this part may be complementary to another part of a symbol formed by the pattern of another flexible guide sheet, or to other parts of symbols formed by the patterns of other flexible guide sheets.

A first injection element 520.1 is arranged to inject light into an edge of the first flexible guide sheet 510.1 and a second injection element 520.2 is able and arranged to inject light into an edge of the second guide sheet 510.2.

The relative arrangement of the injection elements and the flexible guide sheets is in accordance with the explanations set forth above, and is not described in detail again for the third embodiment of FIG. 5.

A first source 530.1 is arranged opposite an input surface of the first injection element 520.1 in such a way as to propagate luminous rays inside the first injection element 520.1 and therefore toward the first flexible guide sheet 510.1. A second source 530.2 is arranged opposite an input surface of the second injection element 520.2 in such a way as to propagate luminous rays inside the second injection element 520.2 and therefore toward the second flexible guide sheet 510.2.

As a variant, a single source may be provided and the luminous module 500 comprises a first optical fiber able to convey light from the single source to the input surface of the first injection element 520.1 and a second optical fiber is able to convey light from the single source to the input surface of the second injection element 520.2.

The first and second sources 530.1 and 530.2, or the single source, may selectively inject light into the first injection element 520.1 and/or into the second injection element 520.2. Such selective injection may be controlled by a control element 540 connected to the two sources 530.1 and 530.2, or controlling the power supply to the two sources 530.1 and 530.2.

The first pattern is etched in the first flexible guide sheet 510.1, while the second pattern is etched in the second flexible guide sheet 510.2. The selective injection of light into the first injection element 520.1 and/or into the second injection element 520.2 thus allows projection of the first pattern, the second pattern, neither of the patterns or both patterns at the same time, thus allowing, by dynamic control, an animation to be created from at least the first and second patterns.

In the example of FIG. 5, a luminous module 500 comprising twelve flexible guide sheets, twelve injection elements and twelve light sources, arranged in a matrix with three rows and four columns, has been shown, purely for illustrative purposes.

No restriction is imposed on the number of flexible guide sheets in the third embodiment. The third embodiment thus applies to N flexible guide sheets, N respectively associated injection elements, and N light sources, or a single source connected by N optical fibers to the N injection elements, with N being any integer greater than or equal to 2.

There is also no restriction imposed on the arrangement of the flexible guide sheets relative to one another. When they are positioned in matrices, no restriction is imposed on the number of rows or the number of columns.

The first and second patterns may have distinct shapes, and may be, for example, identical to the patterns 316.1 and 316.2 of FIG. 3. However, according to the definition of a pattern provided above, the patterns may be any intentional, or predetermined, spatial distribution of luminous intensity. Furthermore, when the patterns are shapes, the first and second patterns may have identical shapes but distinct colors. Indeed, the colors respectively projected for each pattern may vary, when the sources 530.1 and 530.2 produce light of different colors.

The flexible guide sheets may be connected to one another by a supporting matrix structure, which itself may be flexible. As a variant, each flexible guide sheet may be connected to the surrounding flexible guide sheets by fastening means, by bonding, clamping, clipping, or any other method.

The assembly of light sources may be controlled by the control element 540, via a set of wires, with each wire connecting the control element 540 to a light source. The wires may be supported by a structure 550 allowing the wires to be centralized and to be routed toward the control element, thus reducing the footprint, and also allowing the wires to be shielded.

No restriction is imposed on the dimensions of the flexible guide sheets in the X-Y plane. For example, each flexible guide sheet may be rectangular or square, with at least one dimension ranging between 2 and 10 cm. For example, the flexible guide sheets are squares or rectangles, with:

a dimension ranging between 2 cm and 10 cm, for example, between 2 cm and 5 cm, for example, equal to 5 cm; and another dimension ranging between 2 cm and 10 cm, for example, between 2 cm and 5 cm, for example, equal to 5 cm.

For example, each flexible guide sheet is a 3 cm by 3 cm square.

The first, second and third embodiments have been exclusively described with respect to one another. However, it should be noted that these three embodiments may be combined in the same luminous module, in particular:

the first embodiment and the second embodiment may be combined: at least two flexible guide sheets are superimposed, and one of the two flexible guide sheets is associated with two light injection guides able to selectively inject light into two distinct portions of the guide sheet, with two patterns being respectively etched in the two portions;

the first embodiment and the third embodiment may be combined: at least two flexible guide sheets are placed next to one another, and one of the two flexible guide sheets is associated with two light injection guides able to selectively inject light into two distinct portions of the guide sheet, with two patterns being respectively etched in the two portions;

the second embodiment and the third embodiment may be combined: at least two flexible guide sheets are placed next to one another, and one of the two flexible guide sheets is superimposed with a third flexible guide sheet of the luminous module;

the first embodiment, the second embodiment and the third embodiment may be combined: at least two flexible guide sheets are placed next to one another, and one of the two flexible guide sheets is superimposed with a third flexible guide sheet of the luminous module, and one of these three flexible guide sheets is associated with two light injection guides able to selectively inject light into two distinct portions of the guide sheet, with two patterns being respectively etched in the two portions.

Figure 6:
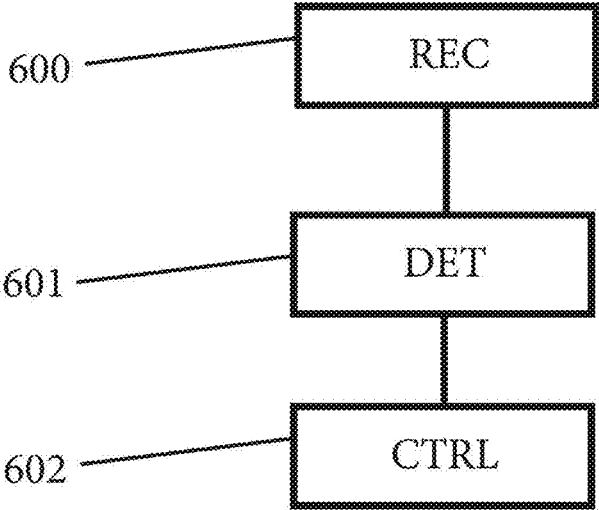
FIG. 6 is a diagram illustrating the steps of a method for controlling a luminous module according to one embodiment of the invention.

FIG. 6 is a diagram illustrating the steps of a method for controlling a luminous module according to one embodiment of the invention.

The control method may be implemented by a control element, such as one of the control elements 340, 440 and 540 able to control the single light source, or the light sources dedicated to the injection elements.

In a step 600, the control element receives an animation command, with the animation command identifying an animation comprising a series of patterns comprising the first pattern and the second pattern. Of course, the animation may have three or more patterns when the luminous module comprises at least three injection elements in which the injection of light may be controlled.

The control element determines, in a step 601, instructions from the animation command for controlling the light source, or light sources, with the control instructions controlling the light source or sources, for selective injection of light into either of the injection elements. The control instructions may correspond to given time ranges, and thus allow the animation indicated in the animation command to be dynamically created. For example, the first pattern is projected during a first time range, then the first pattern and the second pattern are both projected during a second time range following the first time range, and, finally, the second pattern is projected during a third time range following the second time range. The duration of a given time range thus determines the refresh rate of the projected patterns. Such a duration may be of the order of one second, or may be less than one second. In order to allow a fluid animation, the time range may be less than one tenth of a second.

In a step 602, the one or more light sources is/are controlled based on the control instructions, so as to dynamically project the animation.

The control element may comprise a processor configured for one-way or two-way communication, via one or more buses or via a wired connection, with a memory such as a random access memory (RAM) or a read only memory (ROM) or any other type of memory (flash, EEPROM, etc.). As a variant, the memory comprises a plurality of memories of the aforementioned types. Preferably, the memory is a non-volatile memory. The processor is able to execute instructions, which are stored in the memory, for implementing the steps of the control method illustrated with reference to FIG. 6. Alternatively, the processor may be replaced by a microcontroller designed and configured to carry out the steps of the control method according to the invention.

Figure 7:
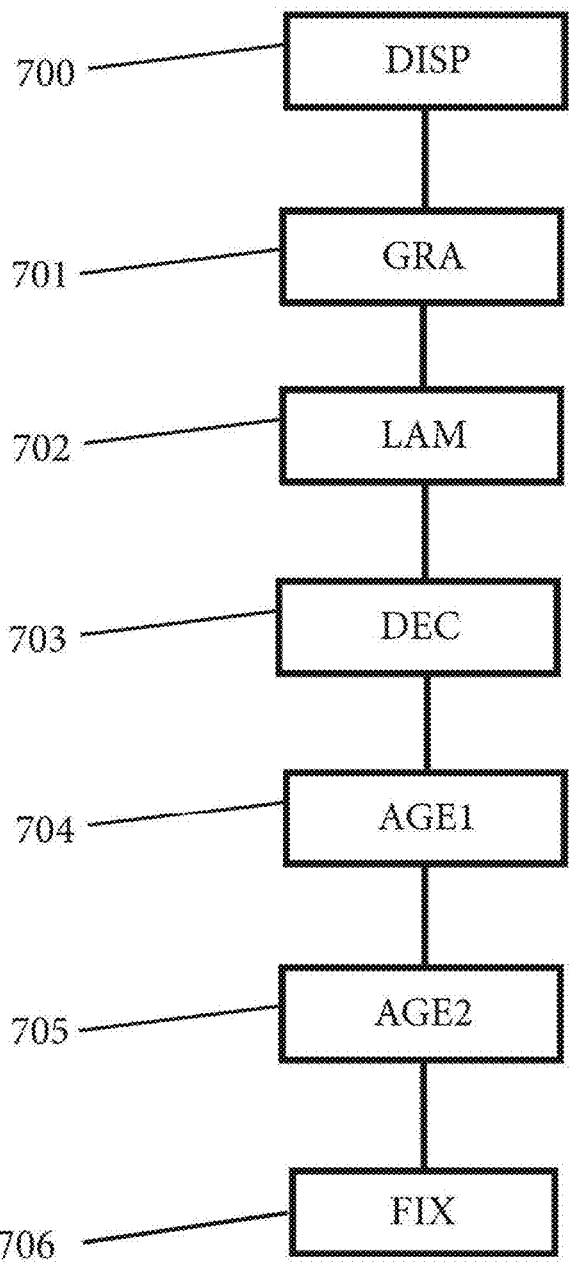
FIG. 7 is a diagram illustrating the steps of a method for manufacturing a luminous module according to one embodiment of the invention.

FIG. 7 is a diagram illustrating the steps of a method for manufacturing a luminous module according to one embodiment of the invention.

The manufacturing method comprises a step 700 of obtaining a roll of flexible film able to guide the light in the thickness thereof, such as the flexible film 111 described with reference to FIG. 1. For example, the roll has at least one dimension of more than around ten centimeters, or even one meter. Preferably, the width of the roll is of the order of several tens of centimeters, or of one meter, and has an upper length, for example, of more than one meter. However, the thickness of the roll is low and equal to the thickness of the flexible film described above, in such a way that several flexible guide sheets may be obtained by cutting the roll.

In a step 702, at least one first and one second pattern on the roll are etched by ultraviolet printing. Microstructures, such as the microstructures 111 described above, are thus formed on the surface of the flexible film, with the microstructures being able to reflect the light guided in the flexible film toward the outside of the flexible film, notably in a direction substantially normal to the plane in which the flexible film extends when it is placed on a flat rigid support.

In a step 702, the roll of flexible film optionally may be laminated so as to add transparent protective layers on each of the faces of the roll of flexible film. Such layers may be the protective layers 112.1 and 112.2 described above with reference to FIG. 1.

In a step 703, the roll, which is optionally laminated, is cut in order to obtain an assembly of at least one flexible guide sheet with a given dimension, with the assembly comprising the first pattern and the second pattern. According to the first embodiment, the first pattern and the second pattern are on the same guide sheet cut in this way, whereas in the second and third embodiments the two patterns are on two distinct flexible guide sheets.

In a step 704, a first injection element and a second injection element are arranged relative to the assembly of at least one previously cut flexible guide sheet. In the first embodiment, the first and second injection elements are fixed to an edge of the same flexible guide sheet. In the second and third embodiments, each injection element is fixed to a given flexible guide sheet, assemblies are thus obtained, with each assembly comprising a flexible guide sheet and an injection element.

In a step 705, at least one light source is arranged in such a way as to selectively inject light into the first light injection element and into the second light injection element. As described above, a light source may be dedicated to each injection element, in which case a light source is added to each assembly for the second and third embodiments, or, alternatively, a single light source is connected to the injection elements by respective optical fibers.

In a step 706, implemented for the first and second embodiments, the assemblies are arranged relative to one another.

In the second embodiment, the assemblies are arranged in such a way that the flexible guide sheets are superimposed. In the third embodiment, the assemblies are arranged next to each other, in the form of a matrix, for example. For this purpose, each assembly may be fixed to a matrix support, or the assemblies may be fixed to one another.

The present invention is not limited to the embodiments described above by way of examples; it extends to other variants.

What is claimed is:

1. A luminous module comprising:

an assembly of at least one flexible guide sheet, with each flexible guide sheet of the assembly being able to receive luminous rays via at least one edge of the flexible guide sheet and to reflect the luminous rays in a direction substantially normal to a surface of the flexible guide sheet according to at least one pattern etched in the flexible guide sheet, wherein the assembly is able to reflect light according to a first pattern and a second pattern etched in the assembly;

at least one first and one second light injection element, with each of the first and second injection elements being able to receive light and to distribute the light throughout the assembly of at least one flexible guide sheet;

at least one light source able to selectively inject light into the first light injection element and into the second light injection element;

wherein the first light injection element and the assembly of at least one flexible guide sheet are arranged in such a way as to project light according to the first pattern and wherein the second light injection element and the assembly of at least one flexible guide sheet are arranged in such a way as to project light according to the second pattern.

2. The luminous module as claimed in claim 1, wherein each injection element from among the first injection element and the second injection element includes a plurality of injection guides, with each injection guide being able to receive light from one end of the guide and to guide the light to a given longitudinal position on the injection element, with the longitudinal positions of the injection guides all being different in such a way as to longitudinally distribute the light throughout the injection element.

3. The luminous module as claimed in claim 1, including a first light source able to inject light into the first light injection element and a second light source able to inject light into the second light injection element.

4. The luminous module as claimed in claim 3, wherein the first light source is able to generate light in a first wavelength range and wherein the second light source is able to generate light in a second wavelength range, different to the first range.

5. The luminous module as claimed in claim 4, wherein the first and second patterns are geometrically identical.

6. The luminous module as claimed in claim 1, wherein the light source is able to selectively inject light into a first optical fiber connected to the first injection element and into a second optical fiber connected to the second injection element.

7. The luminous module as claimed in claim 1, wherein the first injection element is arranged in such a way as to inject light into a first section of the edge of the guide sheet of the assembly, and wherein the second injection element is arranged in such a way as to inject light into a second section of the edge of the flexible guide sheet, with a first portion of the flexible guide sheet located opposite the first section of the edge being etched according to the first pattern, and a second portion of the flexible guide sheet located opposite the second section of the edge being etched according to the second pattern.

8. The luminous module as claimed in claim 1, wherein the assembly includes at least one first and one second flexible guide sheet, with the first pattern being etched in the first flexible guide sheet and the second pattern being etched in the second flexible guide sheet, with the first injection element being arranged in such a way as to inject light into an edge of the first flexible guide sheet and the second injection element being arranged in such a way as to inject light into an edge of the second flexible guide sheet.

9. The luminous module as claimed in claim 8, wherein the first and second guide sheets are superimposed in the luminous module, in order to project the first and second patterns into a common area of the luminous module.

10. The luminous module as claimed in claim 8, wherein the first and second flexible guide sheets are placed next to one another in such a way as to project the first and second patterns at distinct positions.

11. The luminous module as claimed in claim 10, wherein the assembly includes more than two flexible guide sheets placed next to one another in such a way as to form a matrix of flexible guide sheets, with each flexible guide sheet being associated with a light injection element able to inject light into an edge of the flexible guide sheet and each flexible guide sheet having at least one pattern etched in the sheet.

12. The luminous module as claimed in claim 10, wherein the flexible guide sheets of the assembly have the same square or rectangular shape.

13. The luminous module as claimed in claim 12, wherein a dimension of the shape of the guide sheets ranges between 3 and 25 cm, notably between 3 and 5 centimeters.

14. The module as claimed in claim 1, further comprising a control element able to control the at least one light source in order to selectively project light according to the first pattern and according to the second pattern.

15. The module as claimed in claim 14, wherein the control element is able to dynamically control the at least one source in such a way as to produce a luminous animation comprising at least the first and second patterns.

16. The module as claimed in claim 1, wherein each flexible guide sheet in the assembly includes polycarbonate (PC), polymethyl methacrylate (PMMA), thermoplastic polyurethane (TUP) or polyethylene terephthalate (PET) film.

17. The module as claimed in claim 1, wherein each flexible guide sheet includes a film including microstructures, in which each pattern from among the first and second patterns is etched by ultraviolet printing of the microstructures of the film.

18. The module as claimed in claim 17, wherein, for each flexible guide sheet, a surface density of microstructures decreases with the distance from the edge of the guide sheet into which the light is injected.

19. A method for controlling a luminous module, the luminous module includes an assembly of at least one flexible guide sheet, with each flexible guide sheet of the assembly being able to receive luminous rays via at least one edge of the flexible guide sheet and to reflect the luminous rays in a direction substantially normal to a surface of the flexible guide sheet according to at least one pattern etched in the flexible guide sheet, wherein the assembly is able to reflect light according to a first pattern and a second pattern etched in the assembly, at least one first and one second light injection element, with each of the first and second injection elements being able to receive light and to distribute the light throughout the assembly of at least one flexible guide sheet, at least one light source able to selectively inject light into the first light injection element and into the second light injection element, wherein the first light injection element and the assembly of at least one flexible guide sheet are arranged in such a way as to project light according to the first pattern and wherein the second light injection element and the assembly of at least one flexible guide sheet are arranged in such a way as to project light according to the second pattern, implemented by a control element able to control the at least one light source in order to selectively project light according to the first pattern and according to the second pattern, the method comprising receiving an animation command, with the animation command identifying an animation including a series of patterns including the first pattern and the second pattern, and controlling the at least one light source as a function of the animation command, in such a way as to dynamically project the animation.

20. A method for manufacturing a luminous module comprising the following steps of:
   providing a roll of flexible film able to guide light in the thickness thereof;
   etching at least one first and one second pattern on the roll of flexible film using ultra-violet printing;

cutting the roll in order to obtain an assembly of at least one flexible guide sheet with a given dimension, with the assembly comprising the first pattern and the second pattern;

arranging a first injection element and a second injection element relative to the assembly of at least one flexible guide sheet in order to form a luminous module;

arranging at least one light source in the luminous module in such a way as to selectively inject light into the first light injection element and into the second light injection element;

wherein the first light injection element and the assembly of at least one flexible guide sheet are arranged so as to project light according to the first pattern and wherein the second light injection element and the assembly of at least one flexible guide sheet are arranged in such a way as to project light according to the second pattern.

* * * * *